(12) United States Patent
Matsuura et al.

(10) Patent No.: US 8,090,496 B2
(45) Date of Patent: Jan. 3, 2012

(54) VEHICLE INFORMATION NOTIFICATION DEVICE

(75) Inventors: Mitsuyasu Matsuura, Chiryu (JP);
Michihiro Matsuura, Nukata-gun (JP);
Minoru Terada, Takahama (JP);
Toshihiro Hattori, Okazaki (JP)

(73) Assignees: Nippon Soken, Inc., Nishio (JP);
DENSO CORPORATION, Kariya (JP)

( * ) Notice: Subject to any disclaimer, the term of this patent is extended or adjusted under 35 U.S.C. 154(b) by 794 days.

(21) Appl. No.: 12/219,782

(22) Filed: Jul. 29, 2008

(65) Prior Publication Data
US 2009/0043449 A1    Feb. 12, 2009

(30) Foreign Application Priority Data
Aug. 10, 2007   (JP) ................................. 2007-210251

(51) Int. Cl.
*G06F 17/00*   (2006.01)
(52) U.S. Cl. .............................. 701/35; 701/36; 180/271
(58) Field of Classification Search .................... 701/36; 180/271
See application file for complete search history.

(56) References Cited

U.S. PATENT DOCUMENTS

| | | | |
|---|---|---|---|
| 7,272,793 B2 | 9/2007 | Mutsuno et al. | |
| 7,430,470 B2 * | 9/2008 | Cahoon | 701/115 |
| 2005/0203685 A1 | 9/2005 | Kopf et al. | |
| 2006/0082437 A1 | 4/2006 | Yuhara | |
| 2006/0155547 A1 | 7/2006 | Browne et al. | |
| 2006/0161320 A1 * | 7/2006 | Cahoon | 701/36 |
| 2007/0299577 A1 | 12/2007 | Hattori et al. | |
| 2008/0215209 A1 * | 9/2008 | Ikeda et al. | 701/36 |

FOREIGN PATENT DOCUMENTS

| | | |
|---|---|---|
| JP | A-02-207426 | 8/1990 |
| JP | A-2002-049699 | 2/2002 |
| JP | A-2003-114794 | 4/2003 |
| JP | A-2004-26100 | 1/2004 |
| JP | A-2004-38278 | 2/2004 |
| JP | A-2004-217133 | 8/2004 |
| JP | A-2006-131031 | 5/2006 |
| JP | A-2007-38932 | 2/2007 |
| JP | 2007107377 A * | 4/2007 |

OTHER PUBLICATIONS

Notice of Reasons for Refusal mailed on Dec. 15, 2009 issued from the Japanese Patent Office in the corresponding Japanese patent application No. 2007-210251 (and English translation).
Office Action dated Jan. 14, 2010 from the German Patent and Trademark Office in the corresponding patent application No. 10 2008 036 023.6-53 (English translation enclosed).

* cited by examiner

*Primary Examiner* — Drew Brown
(74) *Attorney, Agent, or Firm* — Posz Law Group, PLC (57) ABSTRACT

A vehicle information notification device for notifying vehicle information to a driver of a vehicle with a notification element, the device includes: a first-ride determination element for determining whether it is a first ride of the vehicle for the driver; and a controller for notifying the vehicle information via the notification element when the first-ride determination element determines that it is the first ride. By using the above device, the vehicle information is notified to the driver when the driver rides on the vehicle for the first time. Thus, anxiety of the driver is reduced.

17 Claims, 5 Drawing Sheets

VEHICLE INFORMATION NOTIFICATION DEVICE

CROSS REFERENCE TO RELATED APPLICATION

This application is based on Japanese Patent Application No. 2007-210251 filed on Aug. 10, 2007, the disclosure of which is incorporated herein by reference.

FIELD OF THE INVENTION

The present invention relates to a vehicle information notification device.

BACKGROUND OF THE INVENTION

Even when a driver drives a vehicle, a device displays information about insurance participation on a display. This kind of device is well known (JP-A-2004-38278). The device includes a memory for memorizing data of an insurance contract of the vehicle and a memory card interface for reading out data from a memory card. When a user inserts the memory card in the memory card interface, the data is read out from the memory card. Based on the data from the memory card and the data of the insurance contract memorized in the memory, the information about insurance participation is specified, and the information is shown on the display. Accordingly, the driver can confirm the information about insurance participation when he sees the display. When he notices that the insurance guarantees an accident of the vehicle when he drives the vehicle, his anxiety about the accident is reduced.

When a person drives a vehicle at the first time, he may feel anxiety. One of anxiety is whether insurance guarantees the vehicle that he drives. The device described in JP-A-2004-38278 may inform him that he confirm information about insurance participation even when he drives the vehicle at the first time. However, the device described in JP-A-2004-38278 is not suitably used for him to confirm the information about insurance participation when he drives the vehicle at the first time. Further, unless he brings a memory card, and unless he inserts the memory card in an in-vehicle equipment to read out data from the memory card. Accordingly, he may not confirm the information about insurance participation by using the device described in JP-A-2004-38278 when he drives the vehicle at the first time.

In addition, when he drives the vehicle at the first time, he has much anxiety other than the insurance participation. For example, he may not understand how to operate in-vehicle equipment, so that he feels anxiety. Alternatively, he may not know characteristics of the vehicle, so that he feels anxiety.

In view of the above difficult, it is required for a vehicle information notification device to reduce anxiety of a driver even when he drives the vehicle at the first time.

SUMMARY OF THE INVENTION

In view of the above-described problem, it is an object of the present disclosure to provide a vehicle information notification device.

According to an aspect of the present disclosure, a vehicle information notification device for notifying vehicle information to a driver of a vehicle with a notification element, the device includes: a first-ride determination element for determining whether it is a first ride of the vehicle for the driver; and a controller for notifying the vehicle information via the notification element when the first-ride determination element determines that it is the first ride. By using the above device, the vehicle information is notified to the driver when the driver rides on the vehicle for the first time. Thus, anxiety of the driver is reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
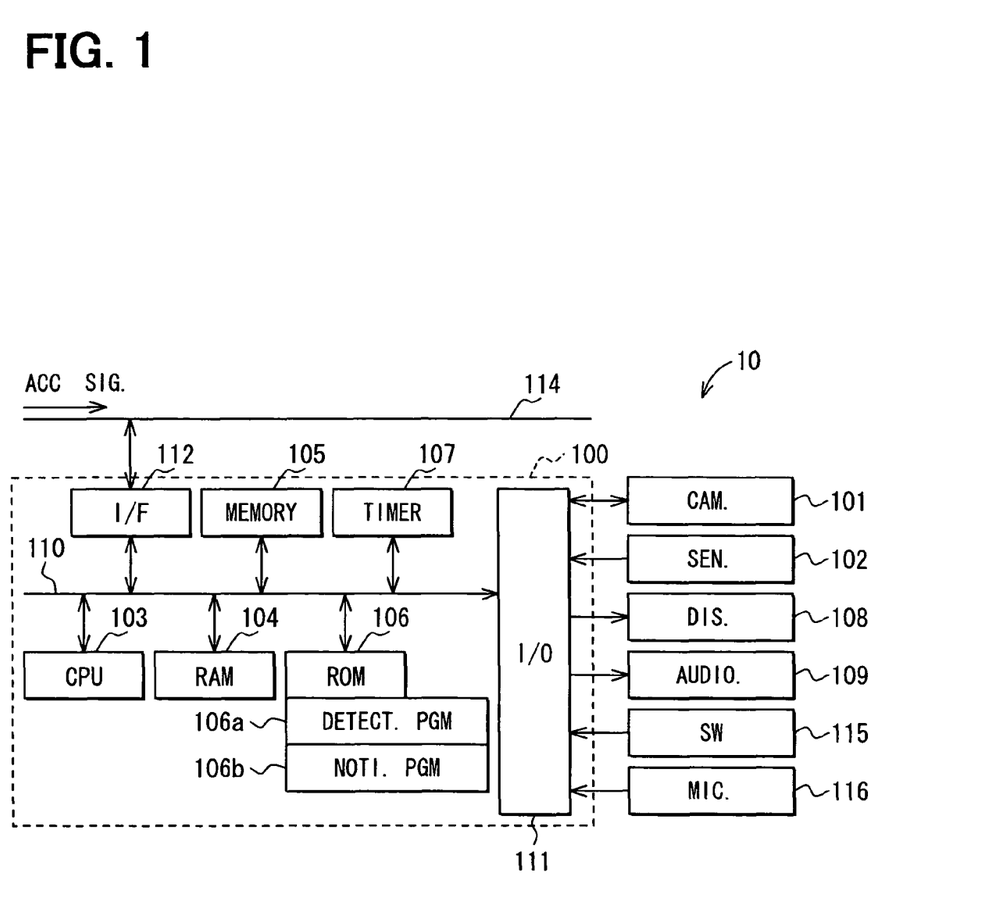
FIG. 1 is a block diagram showing a vehicle information notification device according to an example embodiment.

FIG. 1 shows a vehicle information notification device 10, which is suitably used for a vehicle and mounted on the vehicle.

The vehicle information notification device 10 includes a ECU 100. A camera 101, a sensor 102, a display 108, an audio output element 109, multiple operation switches 115 and a microphone 116 are connected to an input/output element 111 of the ECU 100.

The camera 101 is disposed at a position of the vehicle, from which the camera 101 can take an image of a face of the driver who sits down a driver's seat of the vehicle. The camera 101 takes the image according to an instruction from the ECU 100. The image data taken by the camera 101 is input to the input/output element 111 of the ECU 100.

The sensor 102 is an in-vehicle sensor such as a seat sensor disposed on the driver's seat or various kinds of sensors. A signal from the sensor 102 is input in the input/output element 111 of the ECU 100.

The display 108 is, for example, a liquid crystal display, and disposed at a position so that the display 108 is visible by the driver. For example, the display 108 is mounted on a center portion of a dashboard of the vehicle in a width direction. The audio output element 109 includes an amplifier, a speaker, a voice synthesis circuit and the like. A ROM 103 or the like stores data of digital voice (not shown), and the data of digital voice is converted to an analog voice by the voice synthesis circuit. Then, the analog voice is output from the speaker.

The operational switches 115 are a mechanical switch, a touch switch, remote control switch or the like. The mechanical switch is disposed at a position, at which the driver can operate the switch. The touch switch is integrated in the display 108. The remote control switch is disposed in a remote controller. The microphone 116 picks up sound made from the driver, and the sound such as voice of the driver is converted to an electric signal by the microphone 116. The signal from the microphone 116 is input in the ECU 100.

The construction of the ECU 100 will be explained as follows. The ECU 100 includes a CPU 103, a RAM 104, an external memory 105, a ROM 106, a timer 107, a bus line 110, the input/output element 111, an interface 112 and the like.

The external memory 105 is a non-volatility memory. Vehicle information and database are stored in the external memory 105. In the database, many image data shot by the camera 101 is stored. The external memory 105 stores information about insurance, which guarantees the vehicle.

The ROM 106 stores many programs for being executed by the CPU 103. The programs include a detection program for first ride 106a and a notification program for first ride 106b. The detection program for first ride 106a provides to determine whether the driver rides on the subject vehicle (i.e., whether the driver rides on this vehicle) for the first time when a sensor detects the driver's ride. The notification program for first ride 106b provides to output a predetermined vehicle information memorized in the external memory 105 via a notification element such as one of or both of the display 108 and the audio output element 109 when the detection program for first ride 106a is executed and it is determined that this is the first ride of the driver.

The CPU 103, the RAM 104, the external memory 105, the ROM 106, the timer 107, the input/output element 111, and the interface 112 are mutually communicated and connected with each other via the bus line 110.

The interface 112 is connected to an external bus line 114. Via the external bus line 114, an accessory signal is input in the ECU 100. The timer 107 is used for measuring time of deleting the image data from the database in the external memory 105.

Figure 2:
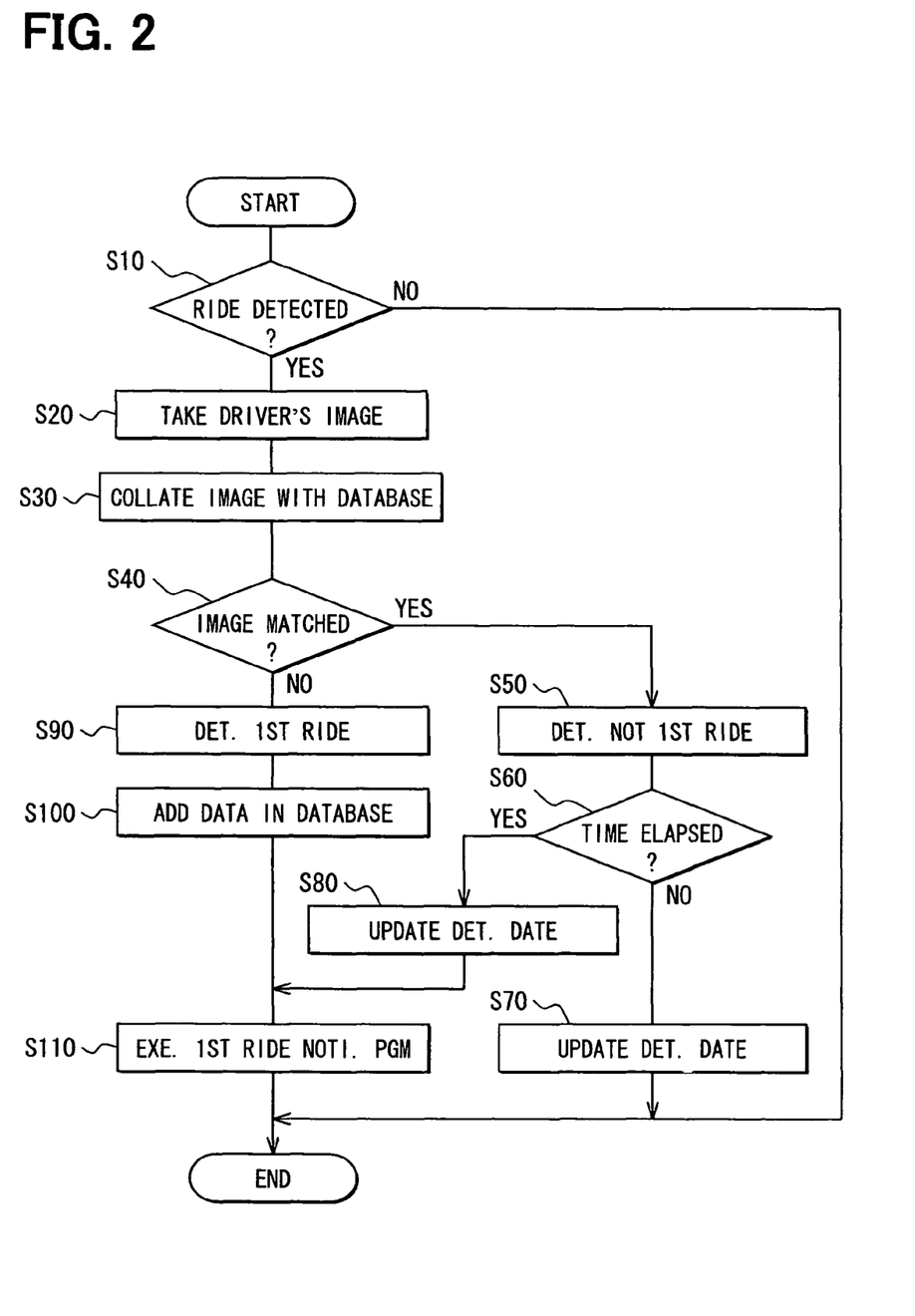
FIG. 2 is a flowchart showing steps of a detection program for first ride executed by a CPU.

FIG. 2 shows a flowchart when the CPU 103 executes the detection program for first ride 106a in the ROM 106. This process starts just after the accessory signal is input in the ECU 100. After that, the CPU 103 repeats to execute the detection program for first ride 106a.

In step S10, based on the signal from the seating sensor disposed on the driver's seat, it is determined whether the driver rides on the vehicle. When the determination is made to "NO," the process in FIG. 2 ends. When the determined is made to "YES," the process proceeds to step S20.

In step S20, an instruction signal for taking an image is output to the camera 101, so that the camera 101 takes images toward the driver's seat. Data of images taken by the camera 101 is obtained. In step S30, the image data obtained through the camera 101 and the image data memorized in the database of the external memory 105 are compared (i.e., collated) by using a well-known face recognition technique.

In step S40, it is determined whether the image data from the camera 101 matches the image data in the database based on the comparison result in step S30. When the image data matches, it goes to step S50, and when the image does not match, it goes to step S90.

In step S50, it is determined that this is not the first ride of the driver so that the driver has ridden on this vehicle equal to or larger than twice. In step S60, the date at this moment is obtained from the timer 107. The date is compared with a last detection date stored in the database, which corresponds to the matched image data so that elapsed time is calculated. It is determined whether the elapsed time is equal to or longer than a predetermined time, for example, one year.

When it is determined to "NO" in step S60, it proceeds to step S70. In step S70, the detection date stored in the database is updated to the present date obtained from the timer 107. Then, the process in FIG. 2 ends. When it is determined to "YES" in step S60, it proceeds to step S80. In step S80, the detection date stored in the database is updated to the present date obtained from the timer 107. Then, the process proceeds to step S110 so that step S110 is executed.

When it is determined to "NO" in step S40, i.e., when the image data from the camera 101 does not match the image data in the database, it proceeds to step S90. In step S90, it is determined that this ride of the driver is the first ride. Here, the case where the image data from the camera 101 does not match the image data in the database is, for example, a case where the driver drives a vehicle which is owned by his friend, a case where the driver drives a vehicle which is a rental car, or a case where the driver is one of family and he drives a vehicle for the first time, the vehicle being owned by another member of the family.

After step S90, it proceeds to step S100. In step S100, the present date is obtained from the timer 107, and then, the present date is set to be a current detection date. The current detection date and the image data obtained in step S20 are memorized in the database of the external memory 105. Then, it proceeds to step S110. In step S110, the notification program for first ride 106b is executed. Then, the process in FIG. 2 ends.

When the notification program for first ride 106b is activated in step S110, the ECU 100 functions as a terminal control unit so that the vehicle information stored in the external memory 105 is output from one of or both of the display 108 and the audio output element 109 as a terminal equipment.

The vehicle information stored in the external memory 105 is, for example, the contract detail of the insurance for the vehicle, specific functions mounted on the vehicle and their setup, setting positions of switches, setting positions of instruments, operation method of an in-vehicle device, vehicle characteristics and the like. Here, information that can be settable or stored at a factory as a factory default is memorized at the factory. Further, the contract detail of the insurance and the like, which are not set at the factory, are stored by the owner of the vehicle with operating the operation switches 115.

Figure 3:
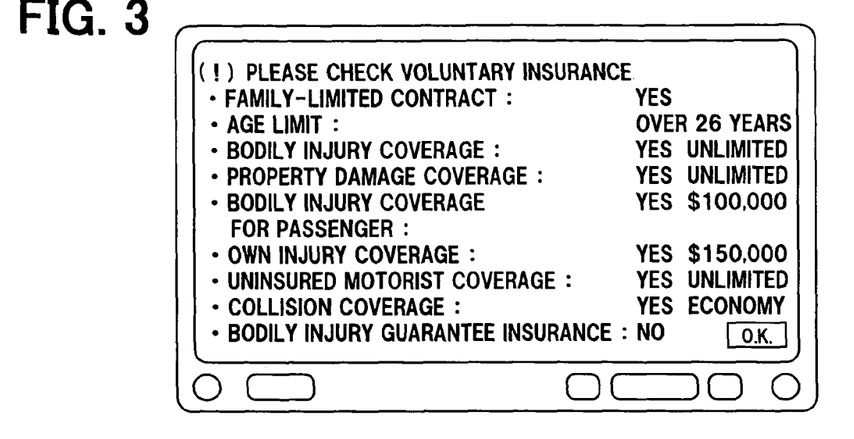
FIG. 3 is a plan view showing a display screen of a display that notifies information of insurance of a vehicle.
Figure 4:
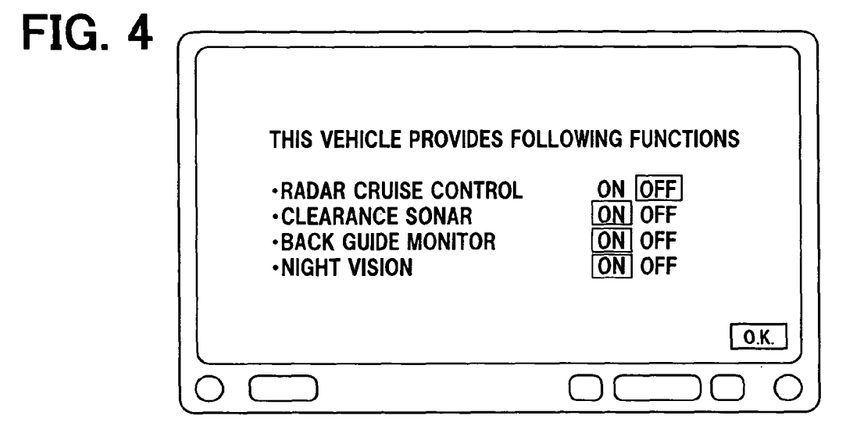
FIG. 4 is a plan view showing the display screen of the display that notifies information of specific functions and their conditions of the vehicle.

FIG. 3 shows an example of notification that is displayed on the display 108. Specifically, the notification relates to the contract detail of the insurance to guarantee the vehicle. FIG. 4 shows another example of notification that is displayed on the display 108. Here, the notification relates to the specific functions mounted on the vehicle and their setup. In FIG. 4, the specific functions of the vehicle are radar cruise control, clearance sonar, back guide monitor, night vision and the like, and thereby, they are shown on the display 108. Further, their operation conditions are also shown on the display 108.

Figure 5:
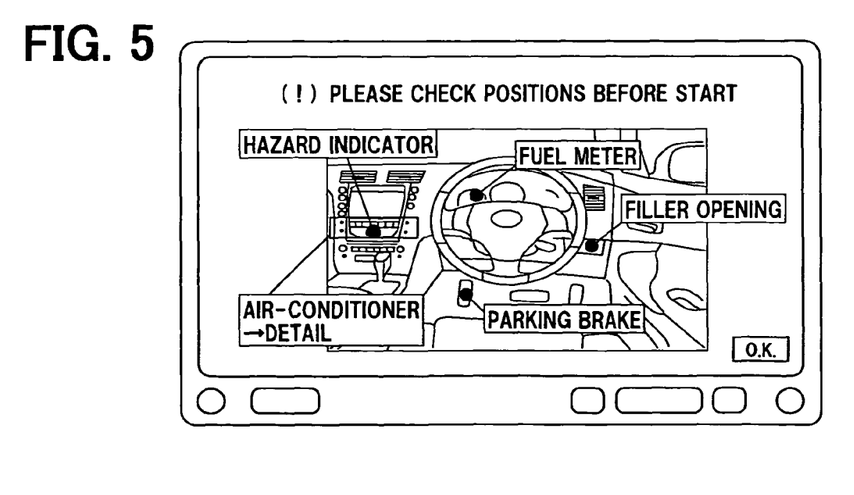
FIG. 5 is a plan view showing the display screen of the display that notifies information of position of switches and a fuel meter of the vehicle.

FIG. 5 shows an example of notification output from the display 108. Specifically, the notification relates to positions of the switches and a fuel meter. In FIG. 5, the positions of the switches are a position of a switch for turning on a hazard indicator, a position of an open/close lever of a filler opening door, a position of a parking brake, a position of an air conditioner switch and the like. Regarding the air conditioner, indication of "detail" is displayed on the display 108. When this indication of "detail" is selected by the operation switches 115, the operation method of the air conditioner is displayed on a screen (not shown) of the display 108.

Figure 6:
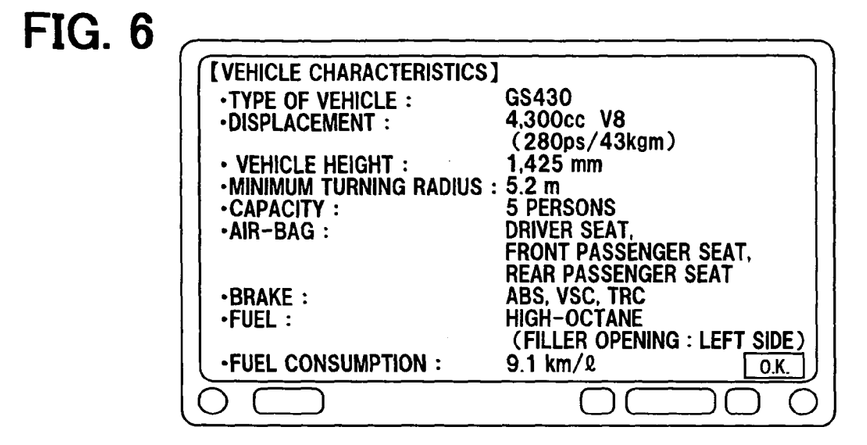
FIG. 6 a plan view showing the display screen of the display that notifies vehicle characteristics.
Figure 7:
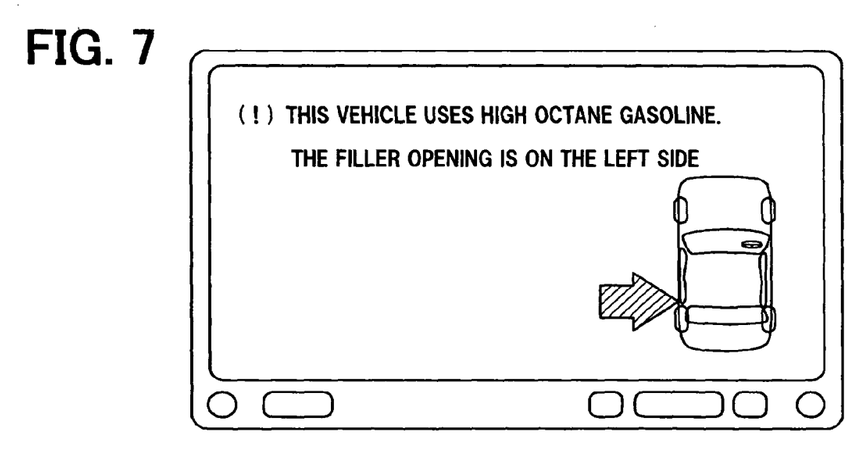
FIG. 7 a plan view showing the display screen of the display that notifies a position of a fuel filler opening.
Figure 8:
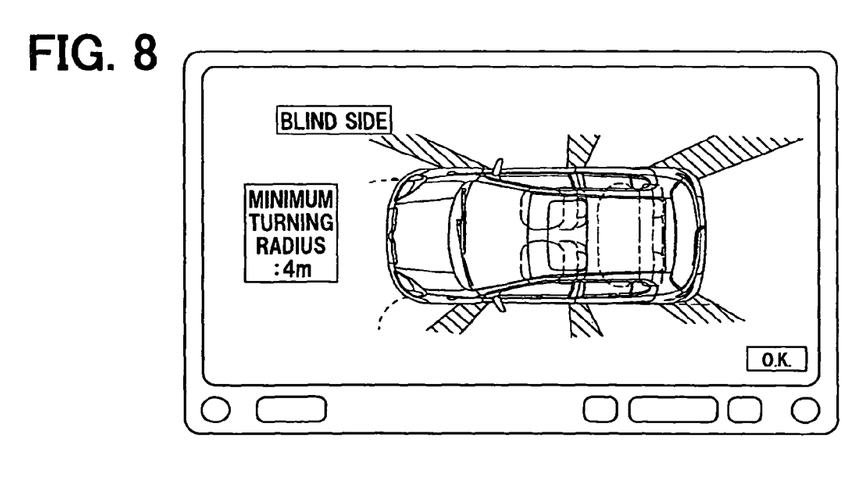
FIG. 8 a plan view showing the display screen of the display that notifies a blind place of a driver.

FIG. 6 is an example of notification for the vehicle characteristics output from the display 108. In FIG. 6, an engine displacement, horsepower of the engine, a vehicle height, a minimum turning radius, a capacity of the vehicle, a seat having an air bag system, function of a brake, a type of fuel, a position of a filler opening, fuel consumption and the like. Further, the vehicle characteristics may include a vehicle length, a vehicle width, a driving type such as a front wheel drive and a rear wheel drive, a blind place from a driver's seat and the like. Further, these vehicle characteristics may be shown as a drawing or a schematic view. FIG. 7 is an example of display for indicating the fuel opening. FIG. 8 is an example of display for indicating the blind place from the driver's seat. In FIG. 8, the minimum turning radius as one of the vehicle characteristics may be shown.

The CPU 103 functions as a means for deciding insurance coverage when the notification program for first ride 106b is activated. When the CPU 103 provides the means for deciding insurance coverage, inquiry instruction for deciding insurance coverage is performed, so that it is determined whether the insurance of the vehicle covers the driver's ride. The decision result is shown on the display 108.

The inquiry instruction for deciding insurance coverage executes to output one or more inquiry messages in a certain order from the display 108 and/or the audio output element 109. Based on the inquiry messages, it is determined whether the insurance of the vehicle covers the present driver's ride. After the inquiry messages are output, the driver inputs reply by using an input device such as the operation switches 115 and the microphone 116. Based on the input data, the CPU 103 determines the reply of the driver corresponding to the inquiry message. Thus, the CPU 103 determines whether the insurance of the vehicle covers the driver's ride.

Figure 9:
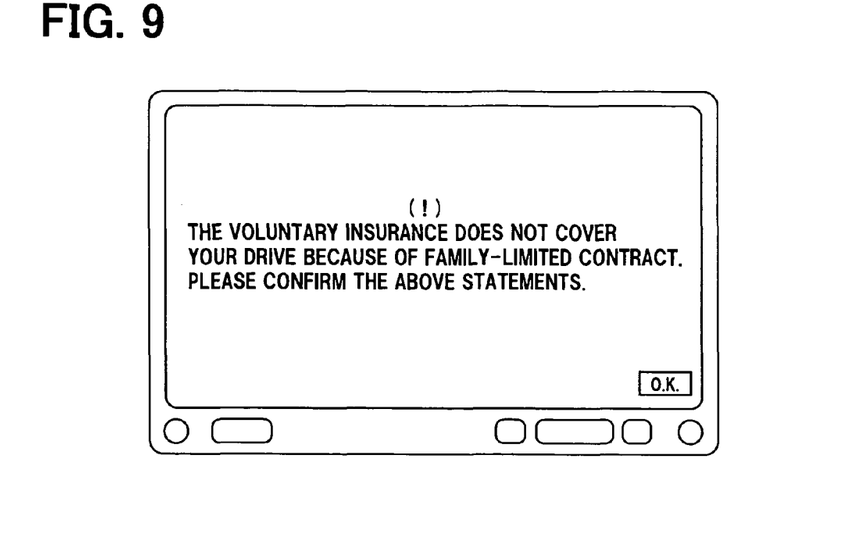
FIG. 9 a plan view showing the display screen of the display that notifies that the insurance of the vehicle does not cover driver's ride.

The inquiry messages are shown as follows, for example. When the voluntary insurance of the vehicle includes a family-limited special contract, the message "Are you family of this car owner?" is output. When the driver answers the question, and the driver input "NO" in the input device, the determination result, for example, shown in FIG. 9 is displayed in the display 108.

Thus, when the CPU 103 detects that the driver rides on the vehicle, the CPU 103 automatically determines by comparing the image of the driver with the image in the database whether this is the first time that the driver rides on the vehicle. When the CPU 103 determines that the driver drives the vehicle for the first time, information about the first ride of the driver is output from the display 108 and the audio output element 109. Thus, anxiety of the driver regarding operation of the first ride of the vehicle is reduced.

The CPU 103 determines whether this is the first ride based on the image of the face of the driver. Accordingly, even though the driver does not have any special element, the CPU 103 can determine whether the driver drives the vehicle for the first time.

In addition to notification of the vehicle information, the CPU 103 determines whether the insurance covers the driver's ride, and informs the driver of the determination result. Accordingly, the driver can recognize whether the insurance covers the driver's drive.

Even when the CPU 103 determines that this is not the first ride of the driver, and when the CPU 103 determines that a predetermined time has elapsed since the last detection date, i.e., since the driver last drove the vehicle, the notification program for first ride 106b is activated so that the same process as a case where the first ride is acknowledged is performed. Accordingly, even if the driver forgets the vehicle information at the time of first ride, the driver can recognize the insurance contract, so that the anxiety of the driver is reduced.

The determination of the first ride may be performed with using biological information other than the face of the driver. For example, the biological information is a fingerprint, a voiceprint, a vein pattern, a retina pattern, an iris pattern, a palm or the like. When the first ride is determined based on the biological information other than the face, it is not necessary for the driver to bring special equipment in order to obtain the vehicle information at the time of first ride.

Figure 10:
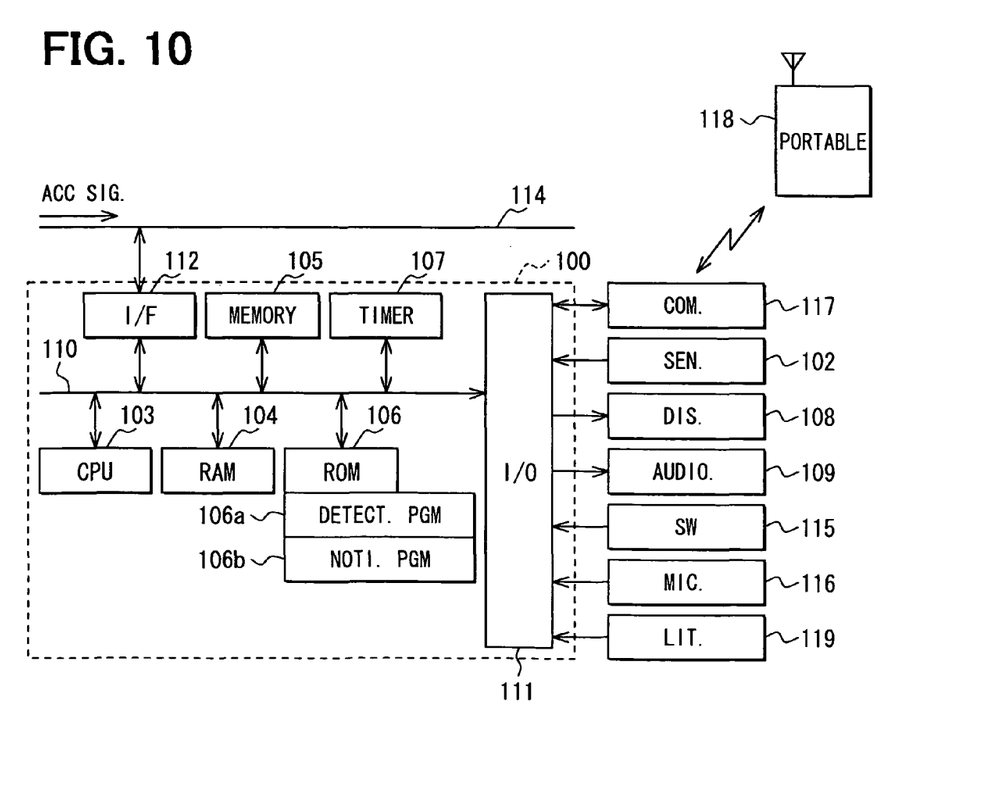
FIG. 10 is a block diagram showing a vehicle information notification device according to another example embodiment.

Although the device 10 includes the camera 101, the device 10 may have a communication device 117 and a portable element 118, as shown in FIG. 10. A user can carry the portable element 118. The user ID is memorized in the portable element 118. Further, the portable element 118 has communication function so that the portable element 118 wirelessly communicates with the communication device 117. Based on the wireless communication between the portable element 118 and the communication device 117, the user ID memorized in the portable element 118 is input in the communication device 117. Based on the user ID, the device 10 determines whether this is the first ride of the driver. In this case, the user ID provides user specific information, and the communication device 117 functions as a reader. The user ID obtained from the communication device 117 is memorized in the external memory 105 and the like successively. The user ID obtained from the communication device 117 is verified with the user ID memorized in the memory 105 and the like, and thus, it is determined whether this is the first ride for the driver. The portable element 118 is, for example, a cellular phone, a smart key, a RFID communication element of the user.

In this embodiment, by performing inquiry control for insurance, it is determined whether the contract of the insurance applied to the vehicle covers the driver's ride. The determination of the first ride may be based on the inquiry. In this case, after the driver rides on the vehicle and sits down the driver's seat, the inquiry message for asking the driver that this time is the first ride of the vehicle is output from the display 108 and the audio output element 109. For example, the message is "Do you drive this vehicle for the first time?" After the message is output, based on the input data from the input element, it is determined whether the driver drives the vehicle for the first time.

When this is the first ride for the driver, a first-ride input switch to be operated by the driver may be disposed in the operation switches 115. Based on a signal from the first-ride input switch, it is determined whether this time is the first ride for the driver. In this case, even if the driver does not have special equipment, it is determined whether the driver drives the vehicle for the first time. Further, the first-ride input switch may be used for the vehicle information notification instruction switch. In this case, even when the driver rides on the vehicle twice or more, if the driver operates the first-ride input switch, the driver can know the vehicle information.

When the first ride is determined by memorizing the user ID in the portable element 118, individual information about insurance may be memorized in the portable element 118 so that it is automatically determined whether the vehicle insurance covers the driver's ride. In this case, the individual information about insurance is obtained by the communication device 117, and then, based on the individual information about insurance and the insurance contract information memorized in the external memory 105, it is determined whether the insurance covers the driver's ride. The individual information about insurance is, for example, about user's name, user's family, user's age and the like.

In this embodiment, even when the driver rides on the vehicle for the second or more times, when the predetermined time has elapsed since the last ride of the driver, the notification program for first ride 106b is performed so that the vehicle information is notified. It may be determined at the first ride whether it is necessary to notice the vehicle information at the time when the driver rides on the vehicle for the second or more times. In this case, at the time when the driver drives the vehicle for the first time, an inquiry message is output. The inquiry message is about asking the driver whether it is necessary for the driver to notice the vehicle information at the time when the driver rides on the vehicle for the second or more times. The determination result is memorized in the external memory 105 together with linking to the image data of the driver. At the first-ride determination process, even when the image obtained from the camera 101 matches the image in the database, and when the information that it is necessary to notify the vehicle information to the driver at the second or more times ride is memorized, the notification program for first ride 106b is executed.

When the first-ride determination is performed based on the user specific information such as the biological information and the user ID, by memorizing the determination result in each user specific information, the number of riding times in each user can be determined. Thus, even when it is determined that this is not the first ride for the user, the information corresponding to the number of riding times may be noticed.

When the first-ride determination is performed based on the user specific information such as the biological information and the user ID, when the determination date is memorized in each user specific information, the elapsed time from the last ride can be determined in each user. Thus, even when it is determined that it is not the first ride, the information corresponding to the elapsed time may be notified. The information corresponding to the elapsed time is, for example, the message such as "How are you?" when the elapsed time ie equal to or longer than a predetermined time. Alternatively, the greeting message corresponding to the elapsed time may be noticed.

A light 119 in FIG. 10 may be arranged near an operation portion that the driver can operate, and a switch and a lever in a compartment of the vehicle are disposed in. At the first ride, when the driver requests to turn on the light 119, the light 119 lights up. Specifically, when it is determined that it is the first ride, a standby state for receiving input of the name of the operation portion from the microphone 116 is held. In the standby state, the device 10 turns on the light 119 corresponding to the name of the operation portion that is input from the microphone 116. The place at which the light 119 is arranged is, for example, near an open lever of a fuel filler door.

In addition to lighting-up of the light 119, the position of the operation portion may be notified by voice. Alternatively, the position of the operation portion may be notified by voice instead of turning on the light 119.

The determination date memorized in the database is updated in every time when the first ride is judged. Based on the determination date, the elapsed time from the last ride is determined whether the elapsed time is equal to or longer than a predetermined time. Alternatively, when a predetermined time has passed since the last determination date, the image data may be deleted from the database. In this case, when the predetermined time has passed from the last determination date, the notification program for first ride 106b is activated.

The above discourse has the following aspects.

A vehicle information notification device for notifying vehicle information to a driver of a vehicle with a notification element, the device includes: a first-ride determination element for determining whether it is a first ride of the vehicle for the driver; and a controller for notifying the vehicle information via the notification element when the first-ride determination element determines that it is the first ride.

Alternatively, the device may further includes: a driver specific information obtaining element for obtaining driver's specific information of the driver getting in the vehicle; and a memory for storing the driver's specific information obtained by the driver specific information obtaining element. The first-ride determination element checks a current driver's specific information obtained by the driver specific information obtaining element with a previous driver's specific information stored in the memory so that the first-ride determination element determines whether it is the first ride of the vehicle for the driver. Further, the driver specific information obtaining element may include a biological information obtaining element for obtaining biological information of the driver. Furthermore, the device may further include: a camera for taking an image of a face of the driver. The biological information obtaining element obtains the image of the face as the biological information of the driver from the camera.

Alternatively, the device may further include: a portable element for being carried by the driver and for storing an user ID therein; and a reader for reading out the user ID from the portable element, wherein the reader is disposed in the vehicle and provides the driver specific information obtaining element. The memory stores the user ID read by the reader, and the first-ride determination element checks a current user ID read by the reader with a previous user ID stored in the memory so that the first-ride determination element determines whether it is the first ride of the vehicle for the driver.

Alternatively, the device may further include: an input element. The first-ride determination element executes a first inquiry process for outputting a first message via the notification element. The first message provides a first inquiry for asking the driver whether it is the first ride of the vehicle for the driver. The driver inputs a first answer of the first inquiry in the input element, and the first-ride determination element determines based on the first answer input in the input element whether it is the first ride of the vehicle for the driver.

Alternatively, the device may further include: a first-ride information input switch for inputting information about first ride of the driver when it is the first ride of the vehicle for the driver. The first-ride determination element determines based on the information input in the first-ride information input switch whether it is the first ride of the vehicle for the driver.

Alternatively, the vehicle information to be notified via the notification element may include an insurance contract of the vehicle. Alternatively, the vehicle information to be notified via the notification element may include a specific function of the vehicle and a setting condition of the specific function. Alternatively, the vehicle information to be notified via the notification element may include at least one of a position of an in-vehicle switch, a position of a meter and an operation method of in-vehicle equipment. Alternatively, the vehicle information to be notified via the notification element may include vehicle characteristics of the vehicle.

Alternatively, the device may further include: an input element; and an insurance coverage determination element. The insurance coverage determination element executes a second inquiry process for outputting a second message via the notification element. The second message provides a second inquiry for asking the driver in order to determine whether an insurance contract of the vehicle covers driver's ride. The driver inputs a second answer of the second inquiry in the input element, and the insurance coverage determination element determines based on the second answer input in the input element whether the insurance contract of the vehicle covers the driver's ride, and the insurance coverage determination element outputs insurance coverage determination result via the notification element.

Alternatively, the device may further include: an insurance coverage determination element. The memory stores insurance information of the vehicle. The portable element stores personal insurance information for determining whether an insurance contract of the vehicle covers driver's ride. The reader reads out the personal insurance information from the portable element. The insurance coverage determination element determines based on the insurance information stored in the memory and the personal insurance information read by the reader whether the insurance contract of the vehicle covers the driver's ride, and the insurance coverage determination element outputs insurance coverage determination result via the notification element.

Alternatively, the device may further include: an additional notification determination element for executing a third inquiry process for outputting a third message via the notification element; an input element; and a determination result storing element. The third message provides a third inquiry for asking the driver at a first-ride time whether it is necessary for the driver to notify the vehicle information after the first ride. The driver inputs a third answer of the third inquiry in the input element. The additional notification determination element determines based on the third answer input in the input element whether it is necessary for the driver to notify the vehicle information after the first ride. The determination result storing element stores additional notification determination result together with the driver's specific information in the memory when the additional notification determination element determines that it is necessary for the driver to notify the vehicle information after the first ride, and the controller controls the notification element to notify the vehicle information when a current driver's specific information obtained by the driver specific information obtaining element matches a previous driver's specific information stored in the memory.

Alternatively, the device may further include: a determination date storing element for storing a determination date together with the driver's specific information in the memory. At the determination date, the first-ride determination element determines whether it is the first ride of the vehicle for the driver, and the controller controls the notification element to notify the vehicle information when a predetermined time has elapsed since a previous determination date stored in the memory.

Alternatively, the device may further include: a riding times determination element for determining a number of riding times of the vehicle for an individual driver based on the first-ride determination result of the first-ride determination element and the driver's specific information obtained by the driver specific information obtaining element. The controller controls the notification element to notify a predetermined information corresponding to the number of riding times determined by the riding times determination element when the first-ride determination element determines that it is not the first ride of the vehicle for the driver.

Alternatively, the device may further include: an elapsed time determination element for determining an elapsed time since a previous ride of an individual driver based on the first-ride determination result of the first-ride determination element and the driver's specific information obtained by the driver specific information obtaining element. The controller controls the notification element to notify a predetermined information corresponding to the elapsed time determined by the elapsed time determination element when the first-ride determination element determines that it is not the first ride of the vehicle for the driver.

Alternatively, the device may further include: a plurality of lights disposed around an operation portion in the vehicle; and a microphone. The operation portion includes a plurality of operation elements, each of which corresponds to a respective light. The microphone inputs a voice data of the driver corresponding to one of the operation elements when the first-ride determination element determines that it is the first ride of the vehicle for the driver, and one light corresponding to the voice data turns on.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A vehicle information notification device for notifying vehicle information to a driver of a vehicle with a notification element, the device comprising:
a first-ride determination element for determining whether it is a first ride of the vehicle for the driver;
a controller for notifying the vehicle information via the notification element when the first-ride determination element determines that it is the first ride;
an input element; and
an insurance coverage determination element,
wherein the insurance coverage determination element executes a second inquiry process for outputting a second message via the notification element,
wherein the second message provides a second inquiry for asking the driver in order to determine whether an insurance contract of the vehicle covers driver's ride,
wherein the driver inputs a second answer of the second inquiry in the input element,
wherein the insurance coverage determination element determines based on the second answer input in the input element whether the insurance contract of the vehicle covers the driver's ride, and
wherein the insurance coverage determination element outputs insurance coverage determination result via the notification element.

2. The device according to claim 1, further comprising:
a driver specific information obtaining element for obtaining driver's specific information of the driver getting in the vehicle; and
a memory for storing the driver's specific information obtained by the driver specific information obtaining element,
wherein the first-ride determination element checks a current driver's specific information obtained by the driver specific information obtaining element with a previous driver's specific information stored in the memory so that the first-ride determination element determines whether it is the first ride of the vehicle for the driver.

3. The device according to claim 2,
wherein the driver specific information obtaining element includes a biological information obtaining element for obtaining biological information of the driver.

4. The device according to claim 3, further comprising:

a camera for taking an image of a face of the driver, wherein the biological information obtaining element obtains the image of the face as the biological information of the driver from the camera.

5. The device according to claim 2, further comprising:

a portable element for being carried by the driver and for storing a user ID therein; and a reader for reading out the user ID from the portable element, wherein the reader is disposed in the vehicle and provides the driver specific information obtaining element, wherein the memory stores the user ID read by the reader, and wherein the first-ride determination element checks a current user ID read by the reader with a previous user ID stored in the memory so that the first-ride determination element determines whether it is the first ride of the vehicle for the driver.

6. The device according to claim 2, further comprising:

a riding times determination element for determining a number of riding times of the vehicle for an individual driver based on the first-ride determination result of the first-ride determination element and the driver's specific information obtained by the driver specific information obtaining element, wherein the controller controls the notification element to notify a predetermined information corresponding to the number of riding times determined by the riding times determination element when the first-ride determination element determines that it is not the first ride of the vehicle for the driver.

7. The device according to claim 1, further comprising:

an input element, wherein the first-ride determination element executes a first inquiry process for outputting a first message via the notification element, wherein the first message provides a first inquiry for asking the driver whether it is the first ride of the vehicle for the driver, wherein the driver inputs a first answer of the first inquiry in the input element, and wherein the first-ride determination element determines based on the first answer input in the input element whether it is the first ride of the vehicle for the driver.

8. The device according to claim 1, further comprising:

a first-ride information input switch for inputting information about first ride of the driver when it is the first ride of the vehicle for the driver, wherein the first-ride determination element determines based on the information input in the first-ride information input switch whether it is the first ride of the vehicle for the driver.

9. The device according to claim 1, wherein the vehicle information to be notified via the notification element includes an insurance contract of the vehicle.

10. The device according to claim 1, wherein the vehicle information to be notified via the notification element includes a specific function of the vehicle and a setting condition of the specific function.

11. The device according to claim 1, wherein the vehicle information to be notified via the notification element includes at least one of a position of an in-vehicle switch, a position of a meter and an operation method of in-vehicle equipment.

12. The device according to claim 1, wherein the vehicle information to be notified via the notification element includes vehicle characteristics of the vehicle.

13. The device according to claim 1, further comprising:

a plurality of lights disposed around an operation portion in the vehicle; and a microphone, wherein the operation portion includes a plurality of operation elements, each of which corresponds to a respective light, wherein the microphone inputs a voice data of the driver corresponding to one of the operation elements when the first-ride determination element determines that it is the first ride of the vehicle for the driver, and wherein one light corresponding to the voice data turns on.

14. A vehicle information notification device for notifying vehicle information to a driver of a vehicle with a notification element, the device comprising:

a first-ride determination element for determining whether it is a first ride of the vehicle for the driver;

a controller for notifying the vehicle information via the notification element when the first-ride determination element determines that it is the first ride;

a driver specific information obtaining element for obtaining driver's specific information of the driver getting in the vehicle; and a memory for storing the driver's specific information obtained by the driver specific information obtaining element, wherein the first-ride determination element checks a current driver's specific information obtained by the driver specific information obtaining element with a previous driver's specific information stored in the memory so that the first-ride determination element determines whether it is the first ride of the vehicle for the driver;

a portable element for being carried by the driver and for storing a user ID therein; and a reader for reading out the user ID from the portable element, wherein the reader is disposed in the vehicle and provides the driver specific information obtaining element, wherein the memory stores the user ID read by the reader, and wherein the first-ride determination element checks a current user ID read by the reader with a previous user ID stored in the memory so that the first-ride determination element determines whether it is the first ride of the vehicle for the driver; and an insurance coverage determination element, wherein the memory stores insurance information of the vehicle, wherein the portable element stores personal insurance information for determining whether an insurance contract of the vehicle covers driver's ride, wherein the reader reads out the personal insurance information from the portable element, wherein the insurance coverage determination element determines based on the insurance information stored in the memory and the personal insurance information read by the reader whether the insurance contract of the vehicle covers the driver's ride, and wherein the insurance coverage determination element outputs insurance coverage determination result via the notification element.

15. A vehicle information notification device for notifying vehicle information to a driver of a vehicle with a notification element, the device comprising:

a first-ride determination element for determining whether it is a first ride of the vehicle for the driver;

a controller for notifying the vehicle information via the notification element when the first-ride determination element determines that it is the first ride;

a driver specific information obtaining element for obtaining driver's specific information of the driver getting in the vehicle; and a memory for storing the driver's specific information obtained by the driver specific information obtaining element, wherein the first-ride determination element checks a current driver's specific information obtained by the driver specific information obtaining element with a previous driver's specific information stored in the memory so that the first-ride determination element determines whether it is the first ride of the vehicle for the driver;

an additional notification determination element for executing a third inquiry process for outputting a third message via the notification element;

an input element; and a determination result storing element, wherein the third message provides a third inquiry for asking the driver at a first-ride time whether it is necessary for the driver to notify the vehicle information after the first ride, wherein the driver inputs a third answer of the third inquiry in the input element, wherein the additional notification determination element determines based on the third answer input in the input element whether it is necessary for the driver to notify the vehicle information after the first ride, wherein the determination result storing element stores additional notification determination result together with the driver's specific information in the memory when the additional notification determination element determines that it is necessary for the driver to notify the vehicle information after the first ride, and wherein the controller controls the notification element to notify the vehicle information when a current driver's specific information obtained by the driver specific information obtaining element matches a previous driver's specific information stored in the memory.

16. A vehicle information notification device for notifying vehicle information to a driver of a vehicle with a notification element, the device comprising:

a first-ride determination element for determining whether it is a first ride of the vehicle for the driver;

a controller for notifying the vehicle information via the notification element when the first-ride determination element determines that it is the first ride;

a driver specific information obtaining element for obtaining driver's specific information of the driver getting in the vehicle; and a memory for storing the driver's specific information obtained by the driver specific information obtaining element, wherein the first-ride determination element checks a current driver's specific information obtained by the driver specific information obtaining element with a previous driver's specific information stored in the memory so that the first-ride determination element determines whether it is the first ride of the vehicle for the driver; and a determination date storing element for storing a determination date together with the driver's specific information in the memory, wherein, at the determination date, the first-ride determination element determines whether it is the first ride of the vehicle for the driver, and wherein the controller controls the notification element to notify the vehicle information when a predetermined time has elapsed since a previous determination date stored in the memory.

17. A vehicle information notification device for notifying vehicle information to a driver of a vehicle with a notification element, the device comprising:

a first-ride determination element for determining whether it is a first ride of the vehicle for the driver;

a controller for notifying the vehicle information via the notification element when the first-ride determination element determines that it is the first ride;

a driver specific information obtaining element for obtaining driver's specific information of the driver getting in the vehicle; and a memory for storing the driver's specific information obtained by the driver specific information obtaining element, wherein the first-ride determination element checks a current driver's specific information obtained by the driver specific information obtaining element with a previous driver's specific information stored in the memory so that the first-ride determination element determines whether it is the first ride of the vehicle for the driver; and an elapsed time determination element for determining an elapsed time since a previous ride of an individual driver based on the first-ride determination result of the first-ride determination element and the driver's specific information obtained by the driver specific information obtaining element, wherein the controller controls the notification element to notify a predetermined information corresponding to the elapsed time determined by the elapsed time determination element when the first-ride determination element determines that it is not the first ride of the vehicle for the driver.

* * * * *